US 8,803,875 B2

(12) United States Patent
Tamaru

(10) Patent No.: US 8,803,875 B2
(45) Date of Patent: Aug. 12, 2014

(54) IMAGE PROCESSING APPARATUS, IMAGE PROCESSING METHOD, AND PROGRAM

(75) Inventor: Masaya Tamaru, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 713 days.

(21) Appl. No.: 13/051,527

(22) Filed: Mar. 18, 2011

(65) Prior Publication Data

US 2011/0242098 A1    Oct. 6, 2011

(30) Foreign Application Priority Data

Mar. 30, 2010    (JP) .................................. 2010-077386

(51) Int. Cl.
*G06T 15/00* (2011.01)
(52) U.S. Cl.
USPC ......................................... 345/419; 382/154
(58) Field of Classification Search
USPC ......................................... 345/419; 382/154
See application file for complete search history.

(56) References Cited

U.S. PATENT DOCUMENTS

2005/0089212 A1*    4/2005    Mashitani et al. ............ 382/154
2008/0187187 A1*    8/2008    Tezuka .......................... 382/118

FOREIGN PATENT DOCUMENTS

| JP | 9-192349 A | 7/1997 |
| JP | 10-90814 A | 4/1998 |
| JP | 2004-129186 A | 4/2004 |
| JP | 2009-81869 A | 4/2009 |

* cited by examiner

*Primary Examiner* — Kee M Tung
*Assistant Examiner* — Peter Hoang
(74) *Attorney, Agent, or Firm* — Sughrue Mion, PLLC

(57) ABSTRACT

When a plurality of faces are arranged in order of distance, a three-dimensional effect evaluation value r for each face is determined on the basis of a three-dimensional effect evaluation function F1 having a point A which internally divides the distance from the front side to the rear side in the depth direction at 1:2 as the vertex. A face with the maximum three-dimensional effect evaluation value r, serving as a face with the highest priority, is determined to be a main object. Then, three-dimensional processing is performed on a plurality of images such that the parallax of the determined main object is the minimum, thereby generating an image for three-dimensional display.

12 Claims, 20 Drawing Sheets

LEFT IMAGE GL

LEFT IMAGE GL

LEFT IMAGE GL

IMAGE PROCESSING APPARATUS, IMAGE PROCESSING METHOD, AND PROGRAM

BACKGROUND OF THE INVENTION

1. Field of the Invention

The present invention relates to an image processing apparatus and method that performs three-dimensional processing for three-dimensional display on a plurality of images having different points of view and generates an image for three-dimensional display which is three-dimensionally displayed on a display unit for three-dimensional display, and a program that allows a computer to perform the image processing method.

2. Description of the Related Art

A technique has been known which combines a plurality of images acquired by imaging the same object at different positions to generate an image for three-dimensional display and three-dimensionally displays the generated image for three-dimensional display, thereby obtaining a three-dimensional image using parallax. As a detailed three-dimensional display method, a parallel-eyed viewing method has been known that arranges a plurality of images in parallel to perform three-dimensional display. In addition, it is possible to perform three-dimensional display by superimposing different colors of a plurality of images, for example, red and blue images or superimposing a plurality of images in different polarization directions to combine the plurality of images, thereby generating an image for three-dimensional display. In this case, image separation glasses, such as red/cyan glasses or polarized glasses, are used to combine a three-dimensionally displayed image for three-dimensional display, thereby achieving three-dimensional display (an anaglyph method and a polarizing filter method).

In addition, for example, as in a parallax barrier method and a lenticular method, it is possible to achieve three-dimensional display by displaying a plurality of images on a three-dimensional display monitor that can three-dimensionally display images, without using the polarized glasses. In this case, a plurality of images is cut in a strip shape in the vertical direction, and the strip-shaped images are alternately arranged to generate an image for three-dimensional display. In this way, three-dimensional display is performed. In addition, a method has been proposed which uses image separation glasses or attaches an optical element to liquid crystal and alternately changes the left and right images at a high speed while changing the ray direction of the left and right images, thereby performing three-dimensional display using the persistence of vision (scan backlight method).

When three-dimensional display is performed in this way, it is necessary to appropriately adjust a three-dimensional effect. Therefore, a method has been proposed which receives an instruction to adjust the amount of parallax of a three-dimensionally displayed image for three-dimensional display and generates an image for three-dimensional display on the basis of the instructed amount of parallax (see JP2004-129186A). In addition, a method has been proposed which adjusts the three-dimensional effect while viewing a displayed image for three-dimensional display, thereby generating an image for three-dimensional display (see JP1998-90814A (JP H10-90814A)). A method has been proposed which adjusts the three-dimensional effect in a game machine (see JP1997-192349A (JP H09-192349A)). Further, a method has been proposed which acquires information in a depth direction during image capture and determines a main object so as to accurately specify the main object (see JP2009-81869A).

SUMMARY OF THE INVENTION

Specifically, the three-dimensional effect is adjusted by aligning a cross point, which is an intersection of lines of sight, with the main object.

When an image includes a person, it is possible to obtain a preferred three-dimensional image by setting the position of the face of the person as the cross point. However, in an image including a plurality of persons, when the cross point is aligned with the face of a person closest to the front side in the depth direction, all of the faces of the other persons recede to the rear side and an image with a low three-dimensional effect is obtained. On the contrary, when the cross point is aligned with the face of the rearmost person, all of the faces of the other persons protrude forward to the front side. As a result, visual fatigue or a sense of discomfort occurs in the image. In addition, in JP2009-81869A, the main object extracting unit determines the main object (cross point) on the basis of information in the depth direction. However, JP2009-81869A does not disclose the adjustment of the cross point considering the problem of, for example, the three-dimensional effect.

The invention has been made in view of the above-mentioned problems and an object of the invention is to provide a technique capable of appropriately adjusting the three-dimensional effect of an image for three-dimensional display including a plurality of persons.

A first image processing apparatus according to an aspect of the invention performs three-dimensional processing for three-dimensional display on a plurality of images which includes a plurality of faces and has different points of view and generates an image for three-dimensional display which is three-dimensionally displayed on a display unit for three-dimensional display. The first image processing apparatus includes: a face detecting unit that detects a face in the image; a distance calculating unit that calculates the distance of each face in a depth direction on the basis of the amount of parallax between the plurality of images; a main object determining unit that determines a face disposed at an intermediate distance, serving as a face with the highest priority, to be a main object when three or more faces are detected in the image and are arranged in order of distance; and a three-dimensional processing unit that performs the three-dimensional processing on the plurality of images such that the parallax of the main object is the minimum, thereby generating the image for three-dimensional display. The "face disposed at the intermediate distance" means a face interposed between a face closest to the front side and a face closest to the rear side in the depth direction among three or more faces which are arranged in order of distance from the imaging unit that captures images. The "front side" means a side close to the imaging unit that captures images, and the "rear side" means a side away from the imaging unit that captures images.

For example the following are required in order to obtain an optimal three-dimensional effect: "(1): there is an object protruding from the main object to the front side"; and "(2): there is an object recessed from the main object to the rear side". In order to achieve the requirements, when a plurality of faces are arranged in order of distance, a face at the intermediate distance, serving as a face with the highest priority may be determined to be the main object.

The face disposed at the intermediate distance, that is the face with the highest priority, may be closest to a point that internally divides the distance from a front side to a rear side in the depth direction at 1:2 when the plurality of faces are arranged in order of distance.

The reason will be described with reference to FIG. 20. FIG. 20 shows a range in which three-dimensional display can be performed indicated by a safety guideline for a three-dimensional image "GL-12: Do not display content beyond the depth range in which content is comfortably viewed" defined by the 3D consortium. In FIG. 20, the unit of numerical values is centimeters.

According to the guideline, for the range in which three-dimensional display can be performed, the amount of protrusion to the front side (the right side of a display surface IS in FIG. 20) needs to be less than the amount of recession to the rear side (the left side of the display surface IS in FIG. 20). When the cross point where parallax is beyond the range is adjusted, visual fatigue or a sense of discomfort is likely to occur.

Therefore, it is preferable that the main object at the cross point deviate from the center between the foremost object and the rearmost object to the front side and an object closest to a point that internally divides the distance from the front side to the rear side in the depth direction at 1:2 be a reference. However, the division ratio is not limited to 1:2, but may be changed depending on a display system or the visual distance of the observer. The important point is that an object deviating from the center to the front side is set as the main object.

Therefore, when only two faces are detected in the image and are arranged in order of distance, a face close to the front side in the depth direction may be determined to be the main object.

The main object determining unit may include a priority adjusting unit that adjusts the priority.

In this case, the priority adjusting unit may adjust the priority on the basis of at least one of the characteristics of the display unit, the reliability of each face, the size of each face, the expression of each face, the color of a region below each face, and the percentage of the color of the skin in a predetermined range of the region below each face.

A second image processing apparatus according to another aspect of the invention performs three-dimensional processing for three-dimensional display on a plurality of images which includes a plurality of faces and has different points of view and generates an image for three-dimensional display which is three-dimensionally displayed on a display unit for three-dimensional display. The second image processing apparatus includes: a face detecting unit that detects a face in the image; a distance calculating unit that calculates the distance of each pixel of the image in a depth direction on the basis of the amount of parallax between the plurality of images; a main object determining unit that determines a face closest to the pixel disposed at an intermediate distance, serving as a face with the highest priority, to be a main object when three or more faces are detected in the image and the pixels are arranged in order of distance; and a three-dimensional processing unit that performs the three-dimensional processing on the plurality of images such that the parallax of the main object is the minimum, thereby generating the image for three-dimensional display.

The pixel disposed at the intermediate distance, that is, a standard pixel for determining the face with the highest priority, may be at a point that internally divides the distance from a front side to a rear side in the depth direction at 1:2 when the pixels are arranged in order of distance.

Therefore, when only two faces are detected in the image and are arranged in order of distance, a face close to the front side in the depth direction may be determined to be the main object.

The second image processing apparatus according to another aspect of the invention differs from the first image processing apparatus in that the face of the person who is disposed in the vicinity of the center of the entire image, not the face of the person who is disposed at the intermediate distance in the depth direction between, is determined to be the main object and the three-dimensional effect is adjusted. The reason of the advantage is the same as that described in the first image processing apparatus.

The main object determining unit may include a priority adjusting unit that adjusts the priority.

In this case, the priority adjusting unit may adjust the priority on the basis of at least one of the characteristics of the display unit, the reliability of each face, the size of each face, the expression of each face, the color of a region below each face, and the percentage of the color of the skin in a predetermined range of the region below each face.

A first image processing method according to another aspect of the invention performs three-dimensional processing for three-dimensional display on a plurality of images which includes a plurality of faces and has different points of view and generates an image for three-dimensional display which is three-dimensionally displayed on a display unit for three-dimensional display. The first image processing method includes: detecting a face in the image; calculating the distance of each face in a depth direction on the basis of the amount of parallax between the plurality of images; determining a face disposed at an intermediate distance, serving as a face with the highest priority, to be a main object when three or more faces are detected in the image and are arranged in order of distance; and performing the three-dimensional processing on the plurality of images such that the parallax of the main object is the minimum, thereby generating the image for three-dimensional display.

A second image processing method according to another aspect of the invention performs three-dimensional processing for three-dimensional display on a plurality of images which includes a plurality of faces and has different points of view and generates an image for three-dimensional display which is three-dimensionally displayed on a display unit for three-dimensional display. The second image processing method includes: detecting a face in the image; calculating the distance of each pixel of the image in a depth direction on the basis of the amount of parallax between the plurality of images; determining a face closest to the pixel disposed at an intermediate distance, serving as a face with the highest priority, to be a main object when three or more faces are detected in the image and the pixels are arranged in order of distance; and performing the three-dimensional processing on the plurality of images such that the parallax of the main object is the minimum, thereby generating the image for three-dimensional display.

According to another aspect of the invention, there is provided a program that allows a computer to perform the first and second image processing methods according to the above-mentioned aspects of the invention.

According to the above-mentioned aspects of the invention, the three-dimensional effect is adjusted using, as the main object, the face of the person who is at the intermediate distance in the depth direction between the persons in an image for three-dimensional display including a plurality of persons or the face of the person who is disposed in the vicinity of the center of the entire image. Therefore, it is possible to obtain an appropriate image for three-dimensional display with a high three-dimensional effect and without visual fatigue or a sense of discomfort.

The face closest to a point that internally divides the distance between the persons from the front side to the rear side in the depth direction at 1:2 or the face closest to the pixel at a point that internally divides the distance of the entire image from the front side to the rear side in the depth direction at 1:2 is determined to be the main object. Therefore, it is possible to obtain an appropriate image for three-dimensional display.

When only two faces are detected in the image and are arranged in order of distance, a face close to the front side in the depth direction is determined to be the main object. Therefore, it is possible to obtain the same effect as described above.

After the main object is determined, priority can be adjusted. Therefore, it is possible to flexibly perform the adjustment.

In this case, the priority is adjusted on the basis of at least one of the characteristics of the display unit, the reliability of each face, the size of each face, the expression of each face, the color of a region below each face, and the percentage of the color of the skin in a predetermined range of the region below each face. Therefore, it is possible to obtain an appropriate image for three-dimensional display considering these conditions.

DESCRIPTION OF THE PREFERRED EMBODIMENTS

Figure 1:
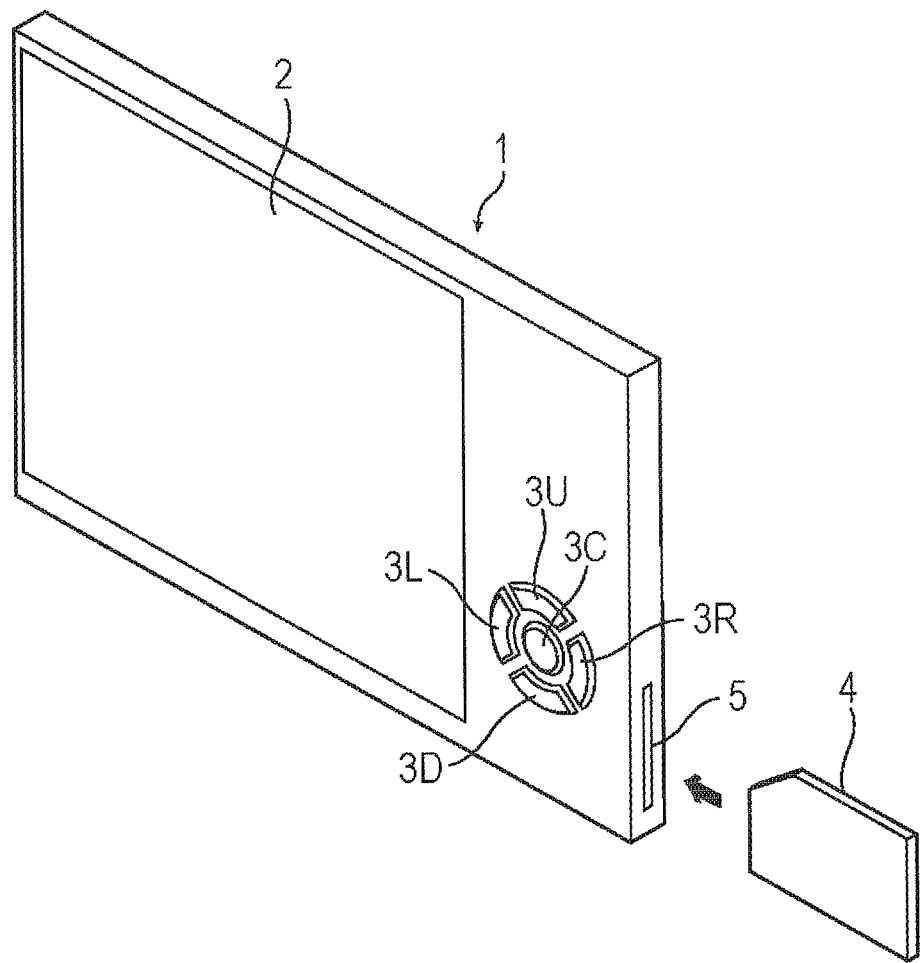
FIG. 1 is a perspective view illustrating the outward structure according to an image processing apparatus according to a first embodiment of the invention.

Hereinafter, exemplary embodiments of the invention will be described with reference to the accompanying drawings. FIG. 1 is a perspective view illustrating the outward structure of an image processing apparatus according to a first embodiment of the invention, and FIG. 2 is a block diagram schematically illustrating the internal structure of the image processing apparatus according to the first embodiment.

As shown in FIG. 1, an image processing apparatus 1 according to the first embodiment includes a liquid crystal display (LCD) 2 and operation buttons 3 on the front surface. In addition, the image processing apparatus 1 includes a slot 5 into which a recording medium 4, such as a memory card, is inserted on the side surface. The image processing apparatus 1 according to the first embodiment three-dimensionally displays an image for three-dimensional display that is generated from a plurality of images captured at different positions and is recorded on the recording medium 4 on the LCD 2. In this embodiment, two images GL and GR are used to perform three-dimensional display. The image GL is an image for the left eye and the image GR is an image for the right eye during three-dimensional display.

The operation buttons 3 include an up button 3U, a down button 3D, a left button 3L, a right button 3R, and a center button 3C.

Figure 2:
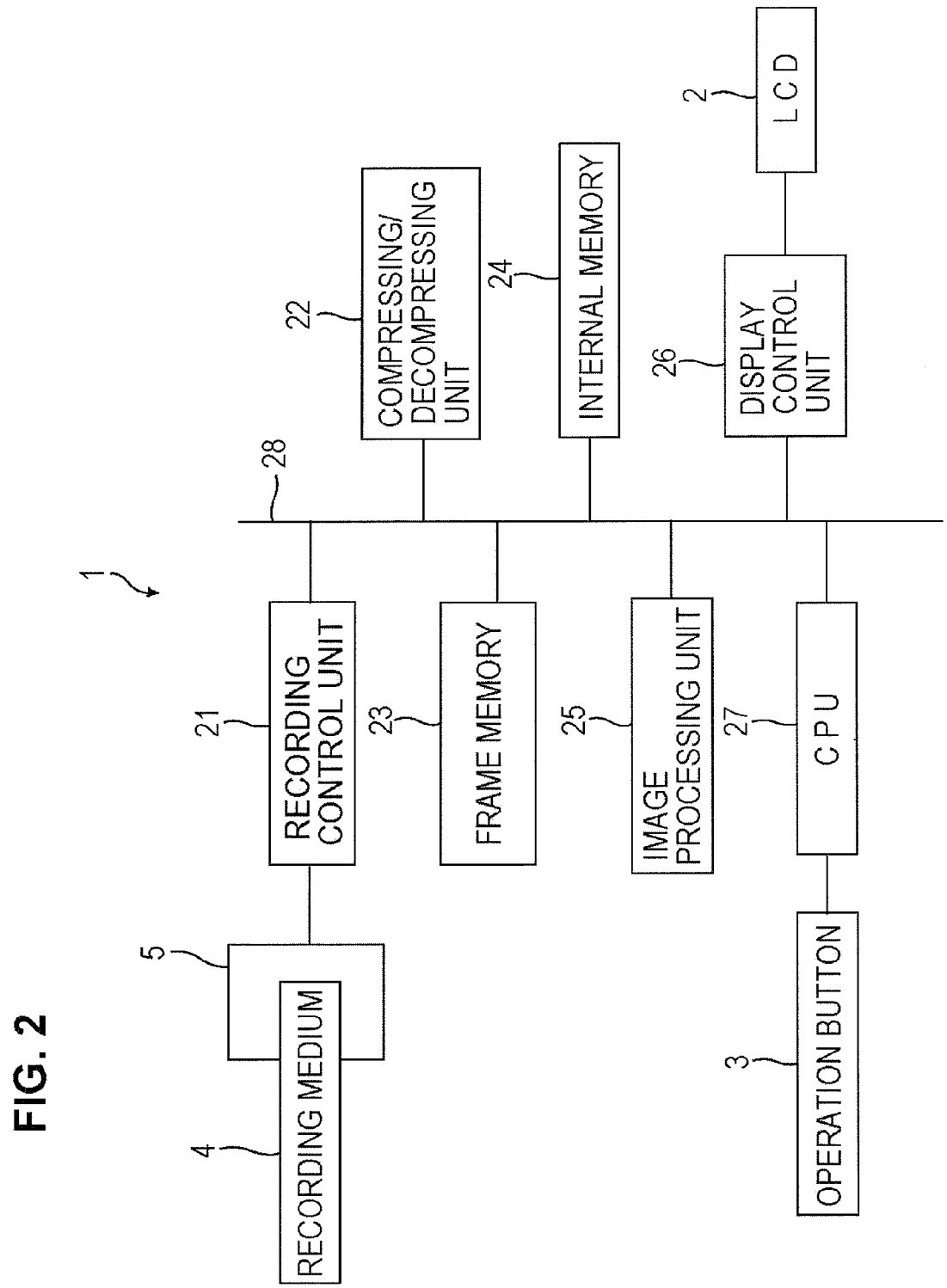
FIG. 2 is a block diagram schematically illustrating the internal structure of the image processing apparatus according to the first embodiment of the invention.

As shown in FIG. 2, the image processing apparatus 1 includes a recording control unit 21, a compressing/decompressing unit 22, a frame memory 23, an internal memory 24, an image processing unit 25, a display control unit 26, and a CPU 27.

The recording control unit 21 controls the reading and writing of information from and to the recording medium 4 inserted into the slot 5.

The compressing/decompressing unit 22 compresses and decompresses the two images GL and GR for three-dimensional display read from the recording medium 4. A tag storing additional information, such as a three-dimensional effect adjustment value and imaging date and time, which will be described below, is given to an image file of the images GL and GR on the basis of, for example, an Exif format.

The frame memory 23 is a work memory used when various kinds of processes including three-dimensional processing, which will be described below, are performed on image data indicating the images GL and GR.

The internal memory 24 stores, for example, various kinds of constants set in the image processing apparatus 1 and programs executed by the CPU 27.

The image processing unit 25 performs three-dimensional processing on the images GL and GR and generates an image for three-dimensional display in order to three-dimensionally display the images GL and GR on the LCD 2. In this embodiment, any known method may be used as the three-dimensional display method. For example, the following methods may be used: a method of displaying the images GL and GR in parallel to perform three-dimensional display using a parallel-eyed viewing method; a lenticular method of attaching a lenticular lens to the LCD 2 and displaying the images GL and GR at predetermined positions on a display surface of the LCD 2 such that the images GL and GR are respectively incident on the left and right eyes, thereby achieving three-dimensional display; and a parallax barrier method of attaching a parallax barrier that changes optical paths to the left and right eyes to the LCD 2 and displaying the images GL and GR at predetermined positions on the display surface of the LCD 2 such that the images GL and GR are respectively incident on the left and right eyes, thereby achieving three-dimensional display.

In addition, the following methods may be used: a method (an anaglyph method and a polarizing filter method) of superimposing the images GL and GR of different colors, for example, red and blue or superimposing the images GL and GR in different polarization directions to combine the images GL and GR, thereby achieving three-dimensional display; and a scan backlight method of alternately separating the optical paths of a backlight of the LCD 2 so as to optically correspond to the left and right eyes, and alternately displaying the images GL and GR on the display surface of the LCD 2 in correspondence with the separation of the optical paths of the backlight on the left and right sides, thereby achieving three-dimensional display.

The LCD 2 is processed according to a three-dimensional processing method performed by the image processing unit 25. For example, when the three-dimensional display method is the lenticular method, a lenticular lens is attached to the display surface of the LCD 2. When the three-dimensional display method is the parallax barrier method, a parallax barrier is attached to the surface of the LCD 2. When the three-dimensional display method is the scan backlight method, an optical element that changes the ray directions of the left and right images is attached to the display surface of the LCD 2.

The image processing unit 25 has the functions of a face detecting unit that detects a face in an image, a distance calculating unit that calculates a distance in the depth direction in each face on the basis of the amount of parallax between a plurality of images, a main object determining unit that determines as a main object a face which has the highest priority and is at an intermediate distance when a plurality of faces are arranged in order of distance, and a three-dimensional processing unit that performs three-dimensional processing on a plurality of images such that the parallax of the main object is the minimum, thereby generating am image for three-dimensional display. In addition, if needed, the image processing unit 25 may perform image processing, such as a white balance adjusting process, gradation correction, sharpness correction, and color correction, on the images GL and GR.

The display control unit 26 three-dimensionally displays the image for three-dimensional display obtained by the three-dimensional processing or two-dimensionally displays the images GL and GR.

The CPU 27 controls each unit of the image processing apparatus 1 in response to instructions input from the operation buttons 3.

The data bus 28 is connected to each unit and the CPU 27 of the image processing apparatus 1 and is used for the transmission of various kinds of data and various kinds of information in the image processing apparatus 1.

Figure 3:
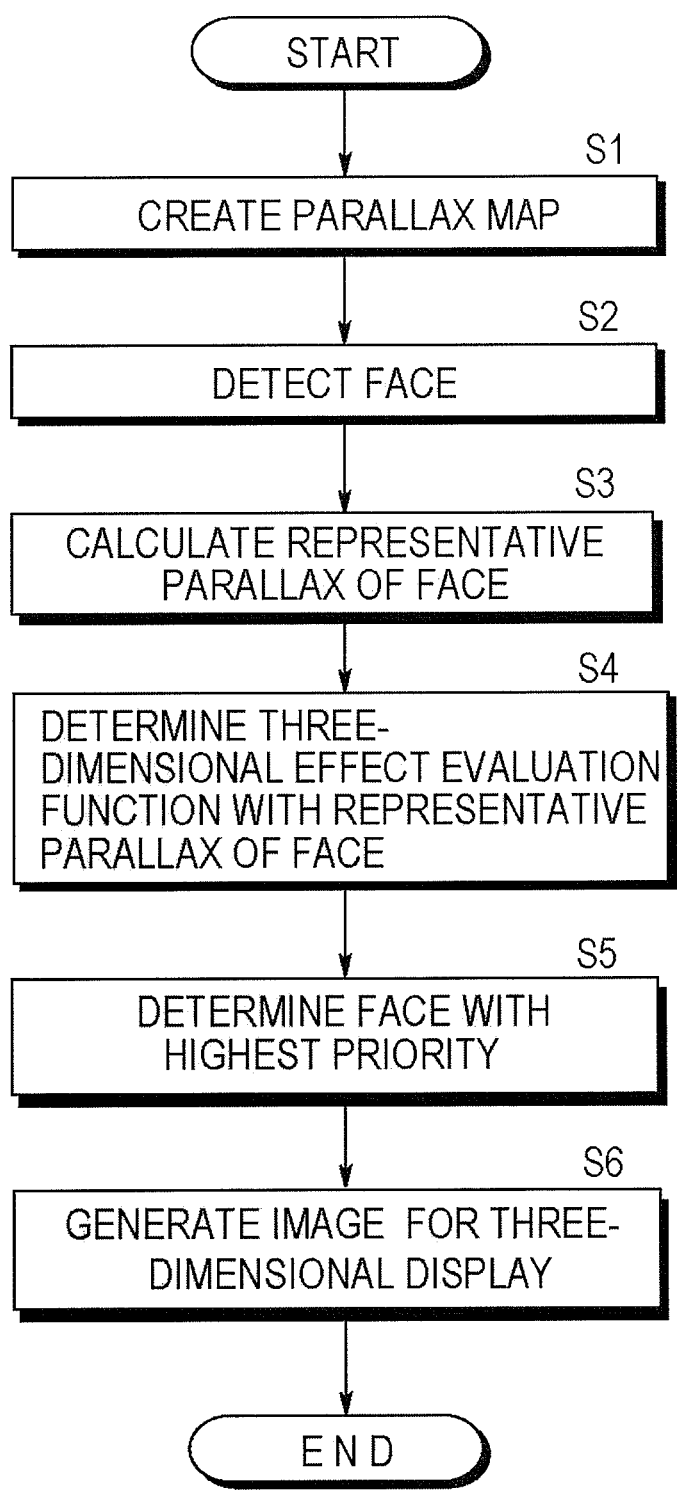
FIG. 3 is a flowchart illustrating a process during the adjustment of a three-dimensional effect in the first embodiment.
Figure 4:
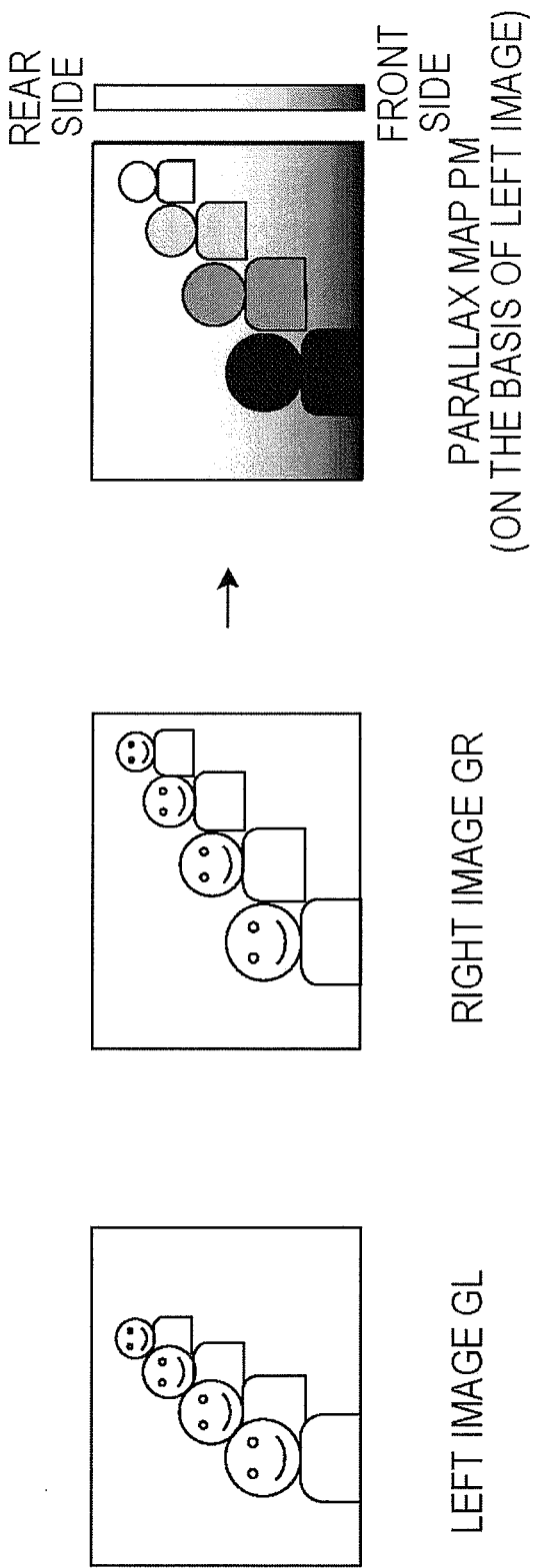
FIG. 4 is a diagram (part 1) illustrating the amount of parallax between the left and right images.
Figure 5:
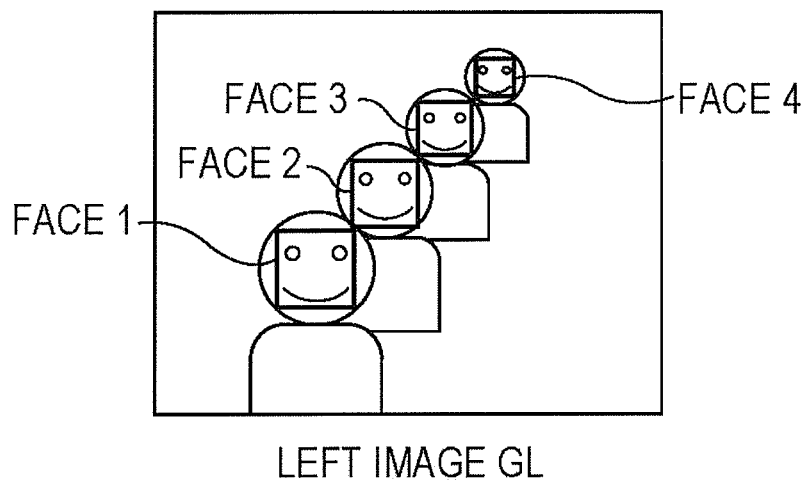
FIG. 5 is a diagram (part 1) illustrating an example of a displayed image.
Figure 6:
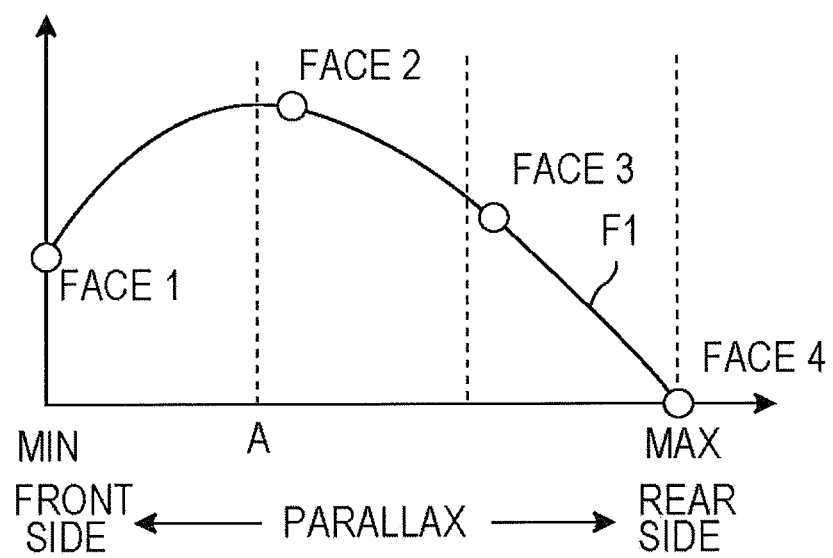
FIG. 6 is a diagram (part 1) illustrating a three-dimensional effect evaluation value.

Next, the process of the first embodiment will be described. FIG. 3 is a flowchart illustrating a process during the adjustment of a three-dimensional effect in the first embodiment. FIG. 4 is a diagram (part 1) illustrating the amount of parallax between the left and right images. FIG. 5 is a diagram (part 1) illustrating an example of a displayed image. FIG. 6 is a diagram (part 1) illustrating a three-dimensional effect evaluation value.

The image processing apparatus 1 according to the first embodiment adjusts the three-dimensional effect using, as the main object, the face of the person disposed in the vicinity of the intermediate position in the depth direction between the persons in the image for three-dimensional display including a plurality of persons. A case in which the lenticular method is used as the three-dimensional display method will be described below.

The two images GL and GR for generating an image for three-dimensional display are obtained by imaging the same object at different positions. Therefore, when the images GL and GR are superimposed on each other, the object included in the images GL and GR has a predetermined amount of parallax. First, as shown in FIG. 4, a parallax map PM is created on the basis of the images GL and GR (Step S1). In the parallax map PM, the amount of parallax of each pixel is represented by brightness using one of the images GL and GR as a standard image. In this embodiment, the left image GL is used as a standard image and the pixel with a large amount of parallax is displayed with high brightness. However, the invention is not limited thereto.

Then, as shown in FIG. 5, face detection is performed in the left image GL, which is the standard image (Step S2), and the representative parallax of each face is calculated (Step S3). Any method may be used to detect the face from the image. For the representative parallax of each face, for example, the center position of the face or the position of the pupil may be used as a standard position. For the representative parallax of each face, the average value of the parallax of a face region may be used as the representative parallax with reference to the parallax map PM, or the amount of parallax at any position, such as the center position of the face or the position of the pupil, may be used as the representative parallax.

Then, as shown in FIG. 6, when a plurality of faces are arranged in order of distance, a three-dimensional effect evaluation value r for each face is determined on the basis of a three-dimensional effect evaluation function F1 having a point A that internally divides the distance from the front side to the rear side in the depth direction at 1:2 as the vertex (Step S4). A face with the maximum three-dimensional effect evaluation value r is used as a face with the highest priority and is determined to be the main object (Step S5).

When the three-dimensional effect evaluation value r is not adjusted, a face 2 with the maximum three-dimensional effect evaluation value r is determined to be the main object. However, the three-dimensional effect evaluation value r of each face may be adjusted on the basis of various conditions. Next, the conditions will be described.

Figure 7:
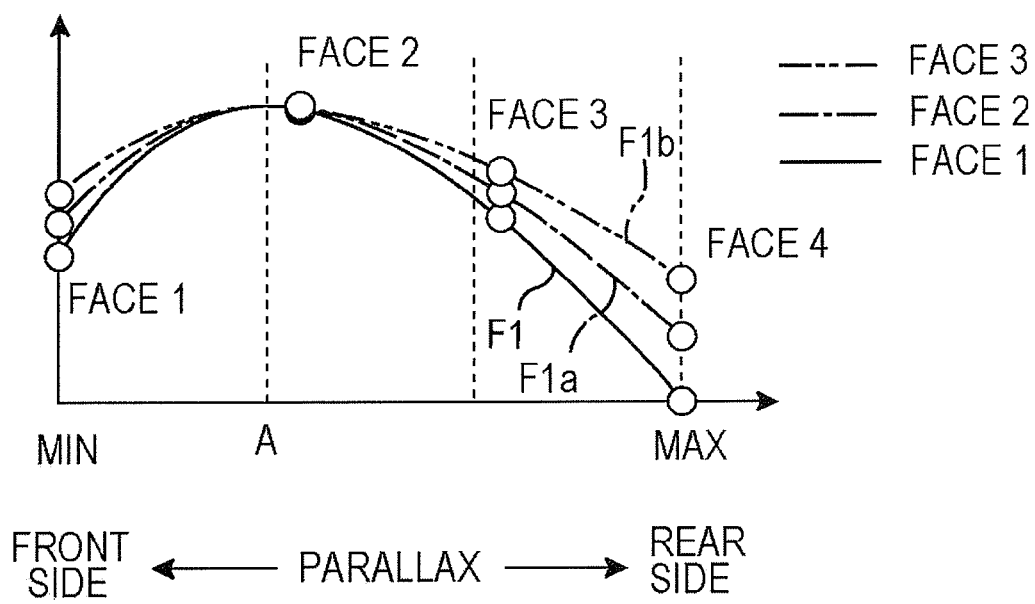
FIG. 7 is a diagram illustrating the three-dimensional effect evaluation value varying depending on each display unit.

For example, the three-dimensional effect evaluation value r may be adjusted on the basis of the characteristics of the display unit. FIG. 7 is a diagram illustrating a case in which different three-dimensional effect evaluation values are set for each display unit.

A method of viewing a three-dimensional image varies depending on the structure of the LCD 2 (display unit). For example, when the lenticular lens is attached, the method of viewing a three-dimensional image varies depending on the crosstalk characteristics of the lenticular lens. When there is a small crosstalk, a cross point seems to appear even when there is a little parallax between the left and right images. Therefore, in this case, as shown in FIG. 7, the position of the vertex is not changed, but the three-dimensional effect evaluation function is changed to another three-dimensional effect evaluation function F1$a$ or F1$b$ in which the other portions have a large three-dimensional effect evaluation value r. As a result, when other adjustment processes, which will be described below, are combined, the priority of each face is likely to be changed.

In cases other than the case in which the lenticular lens is attached, the three-dimensional effect evaluation function may be changed considering the characteristics of the display unit.

Figure 8:
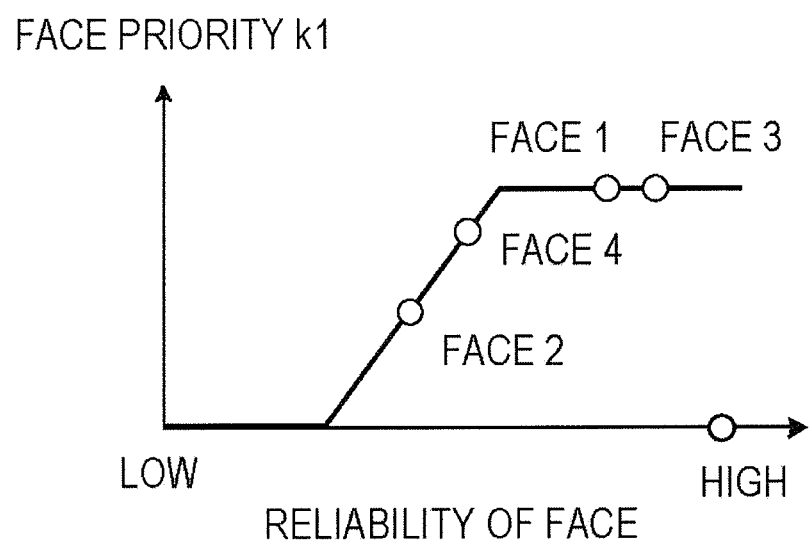
FIG. 8 is a diagram illustrating the adjustment of priority based on the reliability of a face.

The three-dimensional effect evaluation value r may be adjusted on the basis of the reliability of each face. FIG. 8 is a diagram illustrating a case in which priority is adjusted on the basis of the reliability of the face.

The reliability of the face indicates the degree of similarity of the face detected from the image to the rear face. As shown in FIG. 8, as the reliability of the face increases, the value of face priority k1 increases. Various kinds of methods have been proposed to measure the reliability of the face and any of the methods may be used. In this way, it is possible to reduce the influence of an error in the determination of the face. The face priority k1 is a coefficient multiplied by the three-dimensional effect evaluation value r for each face and has a value greater than 0. The final three-dimensional effect evaluation value rf is calculated on the basis of the following Expression 1:

$$rf = r \times k1. \quad \text{[Expression 1]}$$

A face with the maximum three-dimensional effect evaluation value rf is used as a face with the highest priority and is determined to be the main object.

Figure 9:
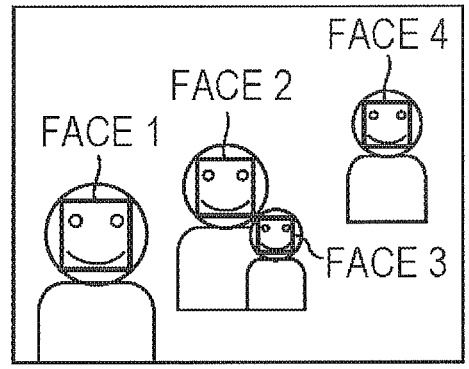
FIG. 9 is a diagram (part 2) illustrating an example of the displayed image.

The three-dimensional effect evaluation value r may be adjusted on the basis of the size of each face. FIG. 9 is a diagram (part 2) illustrating an example of the displayed image, and FIG. 10 is a diagram illustrating the adjustment of the priority based on the size of the face.

Figure 10:
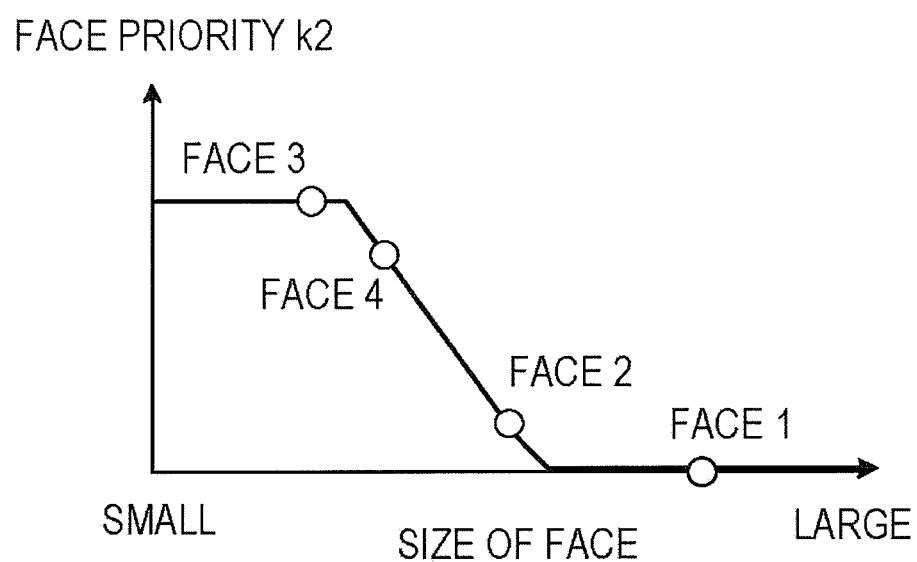
FIG. 10 is a diagram illustrating the adjustment of priority based on the size of a face.

As the size of the face in the image decreases as shown in FIG. 9, the value of face priority k2 increases as shown in FIG. 10. The reason is as follows. In general, in many cases, the image of a child is captured, and a person with a small face is likely to be a child. Therefore, the above-mentioned aspect makes it possible to appropriately select the main object. The face priority k2 is a coefficient multiplied by the three-dimensional effect evaluation value r for each face and has a value greater than 0. The final three-dimensional effect evaluation value rf is calculated on the basis of the following Expression 2:

$$rf = r \times k2. \quad \text{[Expression 2]}$$

A face with the maximum three-dimensional effect evaluation value rf is used as a face with the highest priority and is determined to be the main object.

On the contrary, as the size of the face in the image increases, the value of the face priority k2 may increase.

Figure 11:
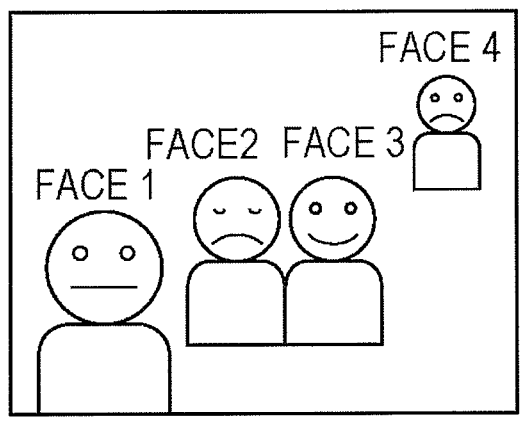
FIG. 11 is a diagram (part 3) illustrating an example of the displayed image.

The three-dimensional effect evaluation value r may be adjusted on the basis of the expression of each face. FIG. 11 is a diagram (part 3) illustrating an example of the displayed image, and FIG. 12 is a diagram illustrating the adjustment of priority based on the facial expression.

Figure 12:
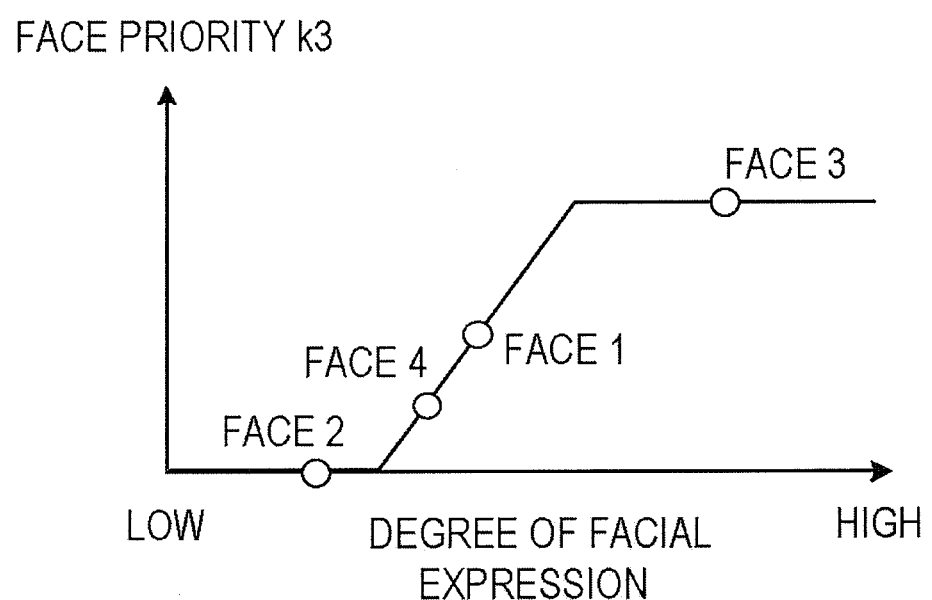
FIG. 12 is a diagram illustrating the adjustment of priority based on a facial expression.

As shown in FIGS. 11 and 12, a smiling face in the image has a large value of face priority k3. Various kinds of methods have been proposed to determine a facial expression, and any of the methods may be used. The reason is as follows. In general, it is preferable to select a person with a smiling face as the main object. Therefore, the above-mentioned aspect makes it possible to appropriately select the main object. The face priority k3 is a coefficient multiplied by the three-dimensional effect evaluation value r for each face and has a value greater than 0. The final three-dimensional effect evaluation value rf is calculated on the basis of the following Expression 3:

$$rf = r \times k3. \quad \text{[Expression 3]}$$

A face with the maximum three-dimensional effect evaluation value rf is used as a face with the highest priority and is determined to be the main object.

The value of the face priority k3 may be adjusted on the basis of facial expressions, such as an angry face, other than the smiling face.

Figure 13:
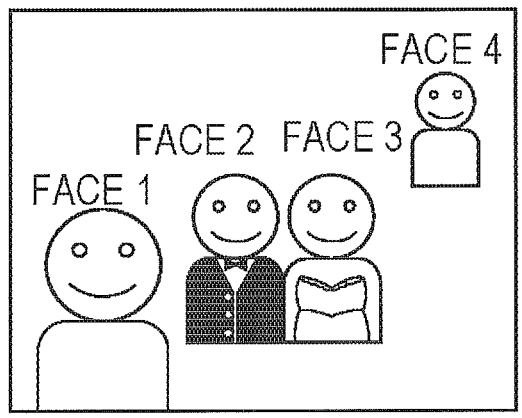
FIG. 13 is a diagram (part 4) illustrating an example of the displayed image.

The three-dimensional effect evaluation value r may be adjusted on the basis of the color of a region below each face. FIG. 13 is a diagram (part 4) illustrating an example of the displayed image, and FIG. 14 is a diagram illustrating the adjustment of priority based on the chroma of the clothes.

Figure 14:
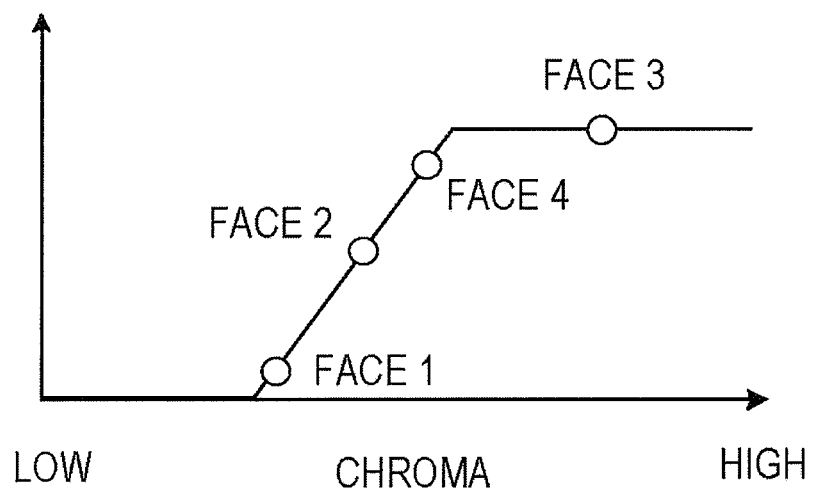
FIG. 14 is a diagram illustrating the adjustment of priority based on the chroma of clothes.

As the chroma of a region below the face, that is, a region which is likely to be a clothed portion of the person, in the image increases as shown in FIG. 13, the value of face priority k4 increases as shown in FIG. 14. The reason is as follows. For example, in a party, such as a wedding ceremony, a person who is dressed in a vivid color is generally a principal person and the principal person is likely to wear the clothes with high chroma. Therefore, the above-mentioned aspect makes it possible to appropriately select the main object. The face priority k4 is a coefficient multiplied by the three-dimensional effect evaluation value r for each face and has a value greater than 0. The final three-dimensional effect evaluation value rf is calculated on the basis of the following Expression 4:

$$rf = r \times k4. \quad \text{[Expression 4]}$$

A face with the maximum three-dimensional effect evaluation value rf is used as a face with the highest priority and is determined to be the main object.

On the contrary, as the chroma of the region below the face in the image is reduced, the value of the face priority k4 may increase.

The three-dimensional effect evaluation value r may be adjusted on the basis of the color of the skin in a predetermined range of the region below each face. FIG. 13 is a diagram (part 4) illustrating an example of the displayed image, and FIG. 15 is a diagram illustrating the adjustment of priority based on the degree of exposure of the skin.

Figure 15:
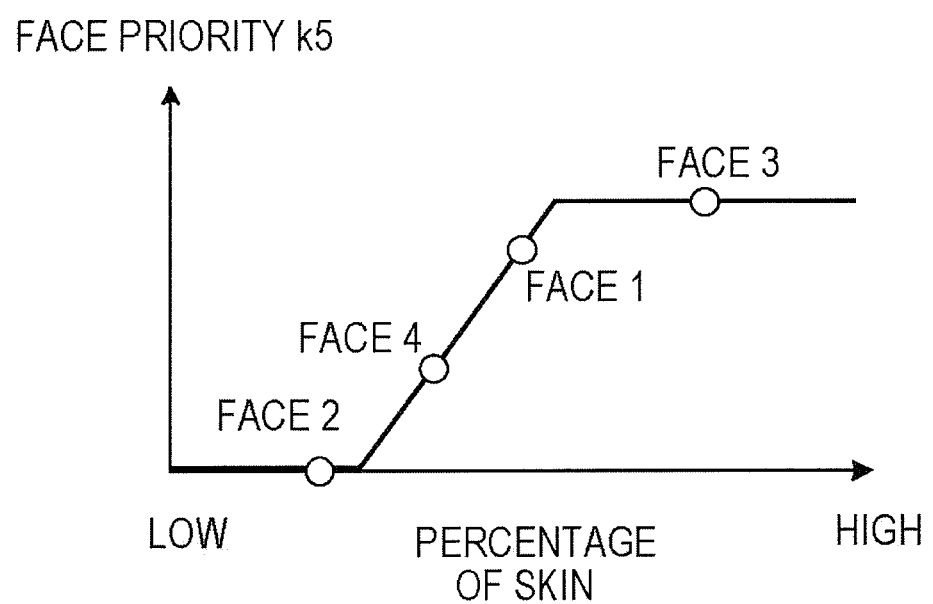
FIG. 15 is a diagram illustrating the adjustment of priority based on the degree of exposure of the skin.

As the percentage of the color of the skin in a predetermined range of a region below the face, that is, a region which is likely to be a clothed portion of the person, in the image increases as shown in FIG. 13, the value of face priority k5 increases as shown in FIG. 15. The reason is as follows. For example, in a party, such as a wedding ceremony, a person who wears clothes that are very revealing is generally a principal person and the person in which the percentage of the color of the skin in a predetermined range of the region below the face is high is likely to be the principal person. Therefore, the above-mentioned aspect makes it possible to appropriately select the main object. The face priority k5 is a coefficient multiplied by the three-dimensional effect evaluation value r for each face and has a value greater than 0. The final three-dimensional effect evaluation value rf is calculated on the basis of the following Expression 5:

$$rf = r \times k5. \quad \text{[Expression 5]}$$

A face with the maximum three-dimensional effect evaluation value rf is used as a face with the highest priority and is determined to be the main object.

On the contrary, as the percentage of the color of the skin in a predetermined range of the region below the face is reduced, the value of face priority k5 may increase.

The above-mentioned adjustment operations may be individually used or two or more of them may be combined with each other to determine the main object. In this case, it is possible to obtain an appropriate image for three-dimensional display according to the needs of the user. When all of the above-mentioned adjustment operations are combined with each other, the final three-dimensional effect evaluation value rf is calculated on the basis of the following Expression 6:

$$rf = r \times k1 \times k2 \times k3 \times k4 \times k5. \quad \text{[Expression 6]}$$

Then, three-dimensional processing is performed on a plurality of images such that the parallax of the main object determined in this way is the minimum, thereby generating an image for three-dimensional display (Step S6).

In this embodiment, the lenticular method is used as the three-dimensional display method. Therefore, as the detailed content of the three-dimensional processing, the coordinates of the images GL and GR in the horizontal direction may be changed such that the main objects of the images GL and GR are displayed at the same position on the LCD 2. When methods other then the lenticular method are used as the three-dimensional display method, the process may be appropriately changed such that the main object is disposed at the cross point in each method.

Finally, the generated image for three-dimensional display is displayed on the LCD 2 and the process ends.

According to the above-mentioned structure, in a captured image in which only the person is the main object, it is possible to obtain an appropriate image for three-dimensional display with a high three-dimensional effect and without visual fatigue or a sense of discomfort.

Figure 16:
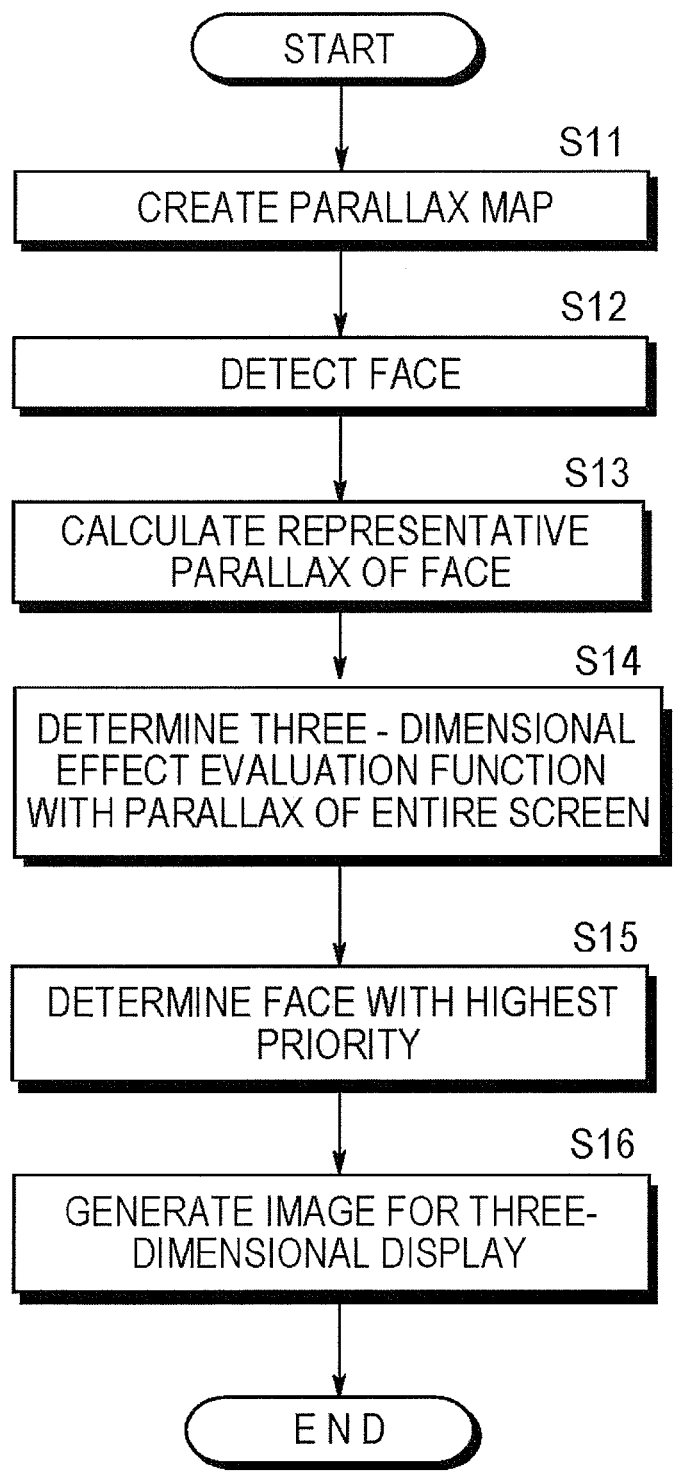
FIG. 16 is a flowchart illustrating a process during the adjustment of a three-dimensional effect in a second embodiment.
Figure 17:
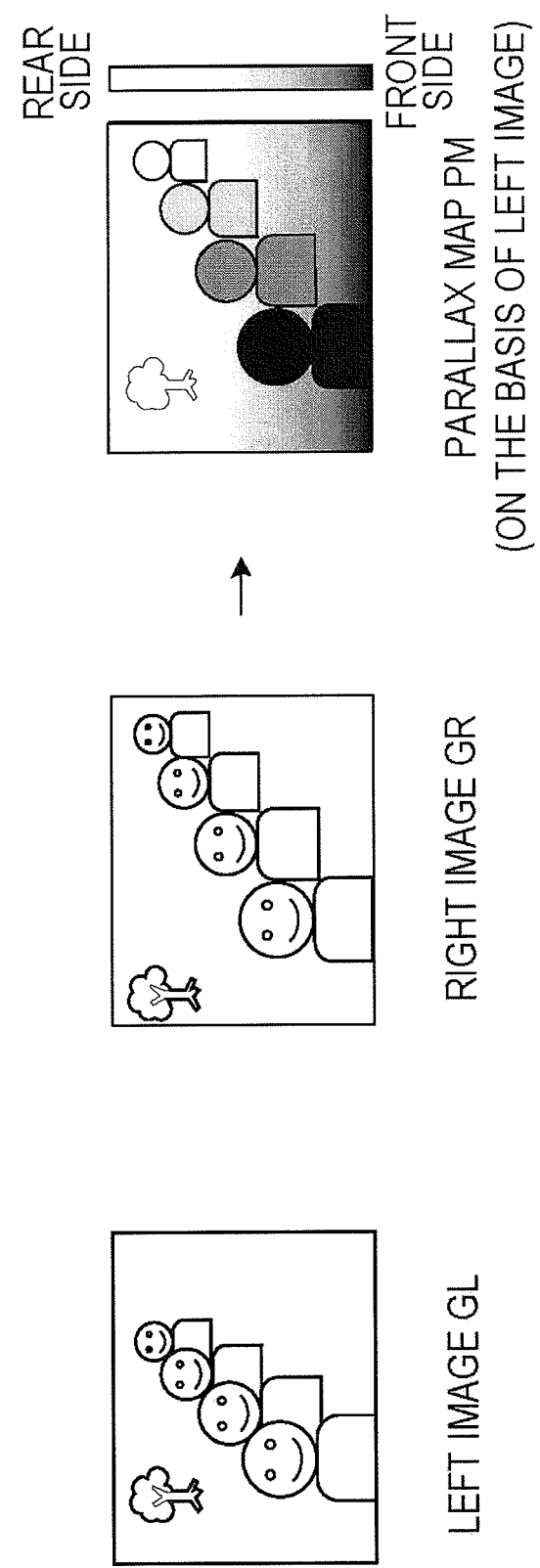
FIG. 17 is a diagram (part 2) illustrating the amount of parallax between the left and right images.
Figure 18:
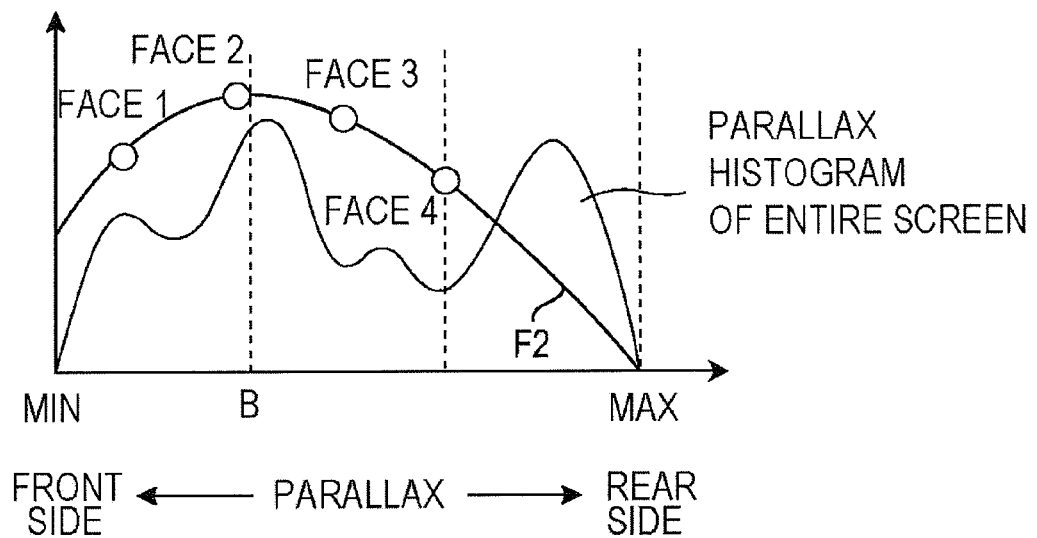
FIG. 18 is a diagram (part 2) illustrating a three-dimensional effect evaluation value.

Next, a second embodiment of the invention will be described. An image processing apparatus according to the second embodiment has the same structure as the image processing apparatus according to the first embodiment except for only the process. Therefore, a detailed description of the structure will be omitted. FIG. 16 is a flowchart illustrating a process when the three-dimensional effect is adjusted in the second embodiment. FIG. 17 is a diagram (part 2) illustrating the amount of parallax between the left and right images. FIG. 18 is a diagram (part 2) illustrating a three-dimensional effect evaluation value.

The image processing apparatus according to this embodiment adjusts the three-dimensional effect using, as the main object, the face of a person disposed in the vicinity of the center of the entire image for three-dimensional display including a plurality of persons. In this embodiment, the lenticular method is used as the three-dimensional display method.

Two images GL and GR for generating the image for three-dimensional display are obtained by imaging the same object at different positions. Therefore, when the images GL and GR are superimposed on each other, the object included in the images GL and GR has a predetermined amount of parallax. First, as shown in FIG. 17, a parallax map PM is created on the basis of the images GL and GR (Step S11). In the parallax map PM, the amount of parallax of each pixel is represented by brightness using one of the images GL and GR as a standard image. In this embodiment, the left image GL is used as a standard image and the pixel with a large amount of parallax is displayed with high brightness. However, the invention is not limited thereto.

Then, face detection is performed in the left image GL, which is the standard image (Step S12), and the representative parallax of each face is calculated (Step S13). Any method may be used to detect the face from the image. For the representative parallax of each face, for example, the center position of the face or the position of the pupil may be used as a reference position.

Then, as shown in FIG. 18, when pixels are arranged in order of distance, a three-dimensional effect evaluation value r for each face is determined on the basis of a three-dimensional effect evaluation function F2 having a point B that internally divides the distance from the front side to the rear side in the depth direction at 1:2 as the vertex (Step S14). A face with the maximum three-dimensional effect evaluation value r is used as a face with the highest priority and is determined to be the main object (Step S15).

When the three-dimensional effect evaluation value r is not adjusted, a face 2 with the maximum three-dimensional effect evaluation value r is determined to be the main object. However, similar to the first embodiment, the three-dimensional effect evaluation value r of each face may be adjusted on the basis of various conditions.

Then, three-dimensional processing is performed on a plurality of images such that the parallax of the main object determined in this way is the minimum, thereby generating an image for three-dimensional display (Step S16).

In this embodiment, the lenticular method is used as the three-dimensional display method. Therefore, as the detailed content of the three-dimensional processing, the coordinates of the images GL and GR in the horizontal direction may be changed such that the main objects of the images GL and GR are displayed at the same position on the LCD 2. When methods other then the lenticular method are used as the three-dimensional display method, the process may be appropriately changed such that the main object is disposed at the cross point in each method.

Finally, the generated image for three-dimensional display is displayed on the LCD 2 and the process ends.

According to the above-mentioned structure, in a captured image including the landscape, it is possible to obtain an appropriate image for three-dimensional display with a high three-dimensional effect and without visual fatigue or a sense of discomfort.

Figure 19:
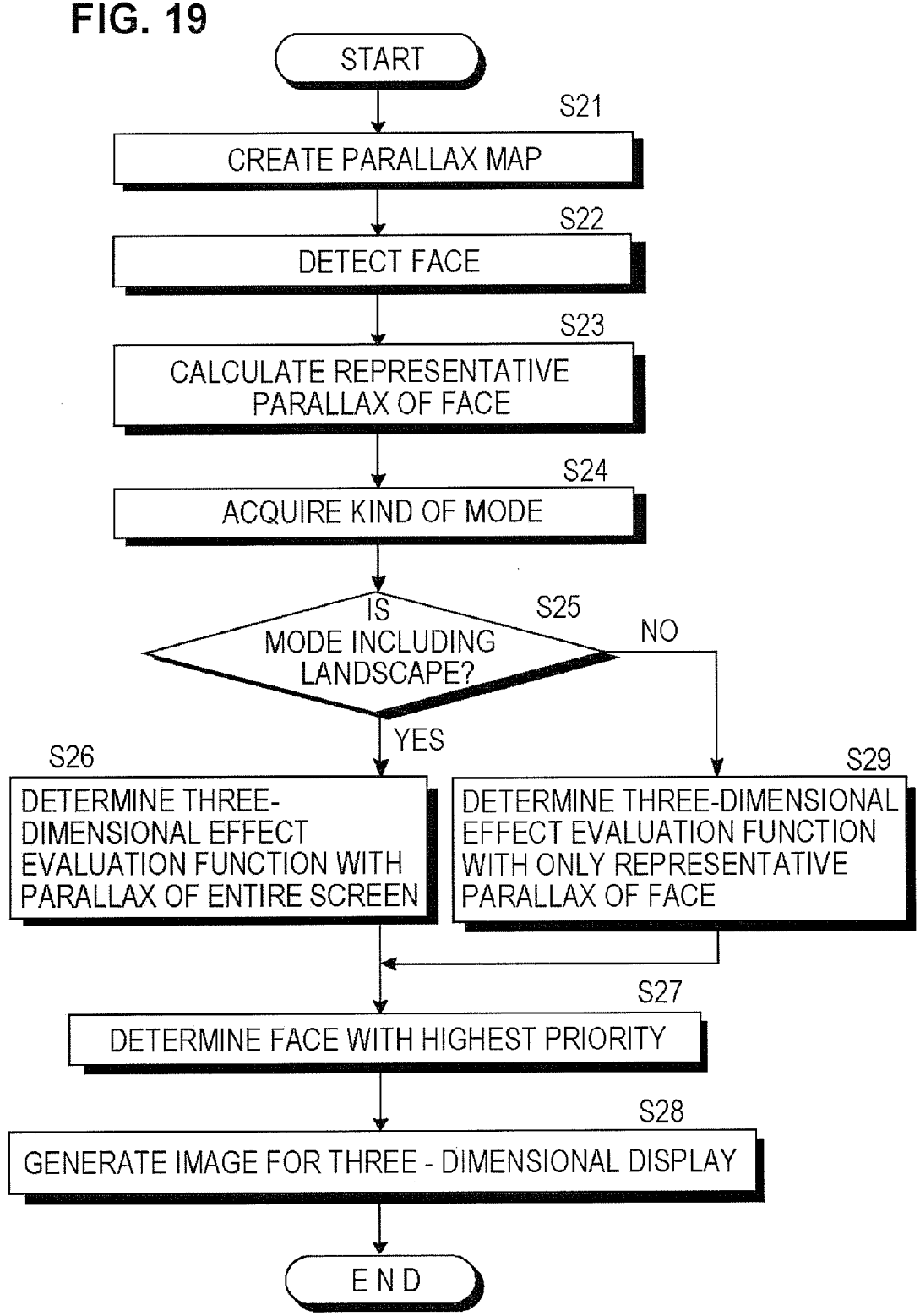
FIG. 19 is a flowchart illustrating a process during the adjustment of a three-dimensional effect in the other aspects.
Figure 20:
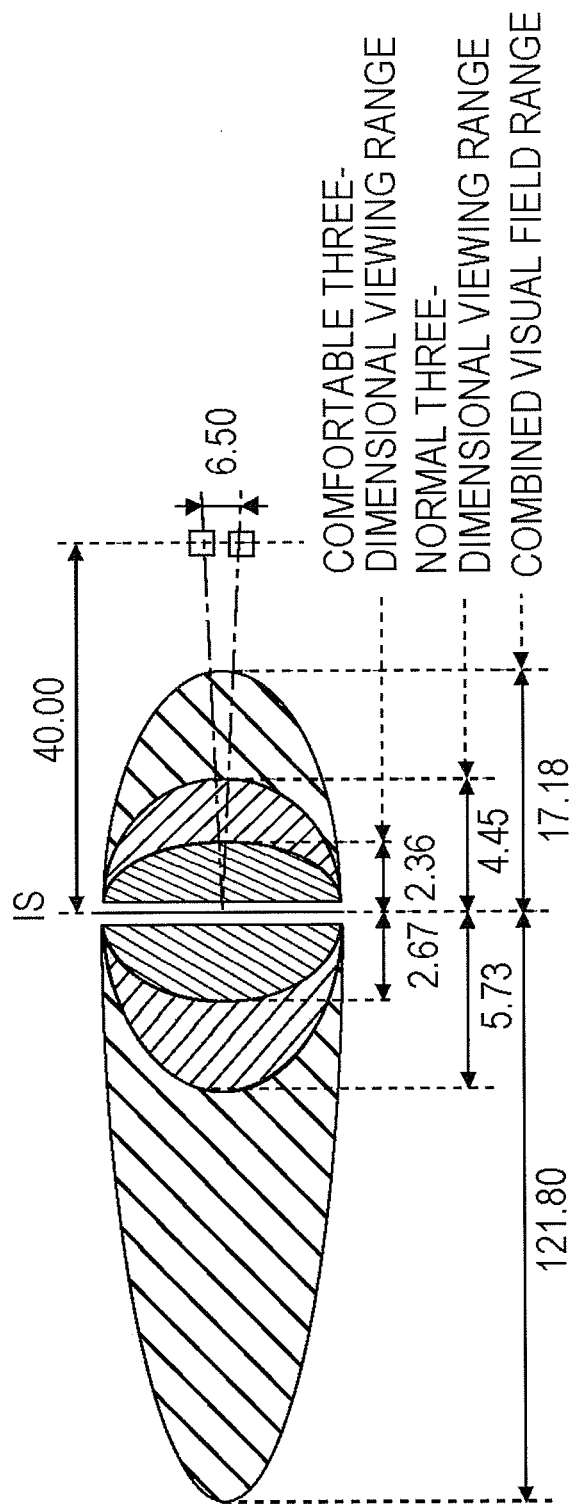
FIG. 20 is a diagram illustrating a range in which three-dimensional display can be performed indicated by a safety guideline for a three-dimensional image defined by the 3D consortium.

The process according to the first embodiment and the process according to the second embodiment may be switched. Next, a process in the above-mentioned aspect will be described. FIG. 19 is a flowchart illustrating a process when the three-dimensional effect is adjusted in this case.

A parallax map is created (Step S21). Then, face detection is performed in a standard image (Step S22). The representative parallax of each face is calculated (Step S23).

Then, the kind of mode of a captured image is acquired (Step S24). The kind of mode is information for determining whether an image for generating the image for three-dimensional display includes only a person as the main object or includes all objects including the landscape. A camera that captures an image may add information of the imaging mode (for example, person/landscape) to image data or the user may manually input the mode to the image processing apparatus according to the embodiment of the invention.

Then, the kind of mode is determined (Step S25). When the imaging mode includes a mode including the landscape, the three-dimensional effect evaluation value r of each face is determined on the basis of the three-dimensional effect evaluation function F2 having the point B that internally divides the distance from the front side to the rear side in the depth direction at 1:2 as the vertex when the pixels are arranged in order of distance, as shown in FIG. 18 (Step S26). A face with the maximum three-dimensional effect evaluation value r is used as a face with the highest priority and is determined to be the main object (Step S27). When the imaging mode is a mode using only the person as the main object, the three-dimensional effect evaluation value r of each face is determined on the basis of the three-dimensional effect evaluation function F1 having the point A that internally divides the distance from the front side to the rear side in the depth direction at 1:2 as the vertex when a plurality of faces are arranged in order of distance, as shown in FIG. 6 (Step S29). A face with the maximum three-dimensional effect evaluation value r is used as a face with the highest priority and is determined to be the main object (Step S27).

When the three-dimensional effect evaluation value r is not adjusted, the face 2 with the maximum three-dimensional effect evaluation value r is determined to be the main object. However, similar to the first and second embodiments, the three-dimensional effect evaluation value r of each face may be adjusted on the basis of various conditions.

Then, three-dimensional processing is performed on a plurality of images such that the parallax of the main object determined in this way is the minimum, thereby generating an image for three-dimensional display (Step S28). Finally, the generated image for three-dimensional display is displayed on the LCD 2 and the process ends.

According to the above-mentioned structure, it is possible to select an optimal process according to the content of an image. Therefore, it is possible to obtain an appropriate image for three-dimensional display.

The image processing apparatus 1 according to the first and second embodiments may be applied to a compound-eye imaging apparatus including a plurality of imaging units. In this case, a plurality of captured images may be directly displayed, the three-dimensional effect may be adjusted, and the result may be recorded on the recording medium 4.

The apparatuses 1 according to the embodiments of the invention have been described above. A program that allows a computer to function as units corresponding to the image processing unit 25, the recording control unit 21, and the display control unit 26 and perform the processes shown in FIG. 3, FIG. 16, and FIG. 19 is also an example of the invention. In addition, a computer-readable recording medium having the program recorded thereon is an embodiment of the invention.

What is claimed is:

1. An image processing apparatus that performs three-dimensional processing for three-dimensional display on a plurality of images which includes a plurality of faces and has different points of view and generates an image for three-dimensional display which is three-dimensionally displayed on a display unit for three-dimensional display, comprising:
   a face detecting unit that detects a face in the image;
   a distance calculating unit that calculates the distance of each face in a depth direction on the basis of the amount of parallax between the plurality of images;
   a main object determining unit that determines a face disposed at an intermediate distance, serving as a face with the highest priority, to be a main object when three or more faces are detected in the image and are arranged in order of distance; and
   a three-dimensional processing unit that performs the three-dimensional processing on the plurality of images such that the parallax of the main object is the minimum, thereby generating the image for three-dimensional display;
   wherein the main object determining unit includes a priority adjusting unit that adjusts the priority;
   wherein a three-dimensional effect evaluation value for each face is determined on the basis of a three-dimensional effect evaluation function having a point that is one-third of the distance from a front of the image to a rear of the image in the depth direction as the vertex; and
   wherein a face having a maximum three-dimensional effect evaluation value is used as the face with the highest priority and is determined to be the main object.

2. The image processing apparatus according to claim 1, wherein the face disposed at the intermediate distance is closest to a point that is one-third of the distance from a front of the image to a rear of the image the depth direction when the plurality of faces is arranged in order of distance.

3. The image processing apparatus according to claim 1, wherein, when two faces are detected in the image and are arranged in order of distance, the main object determining unit further has a function of determining the face arranged on the front side in the depth direction to be the main object.

4. The image processing apparatus according to claim 1, wherein the priority adjusting unit adjusts the priority on the basis of at least one of the characteristics of the display unit, the reliability of each face, the size of each face, the expression of each face, the color of a region below each face, and the percentage of the color of the skin in a predetermined range of the region below each face.

5. An image processing apparatus that performs three-dimensional processing for three-dimensional display on a plurality of images which includes a plurality of faces and has different points of view and generates an image for three-dimensional display which is three-dimensionally displayed on a display unit for three-dimensional display, comprising:
   a face detecting unit that detects a face in the image;
   a distance calculating unit that calculates the distance of each pixel of the image in a depth direction on the basis of the amount of parallax between the plurality of images;
   a main object determining unit that determines a face closest to the pixel disposed at an intermediate distance, serving as a face with the highest priority, to be a main object when three or more faces are detected in the image and the pixels are arranged in order of distance; and
   a three-dimensional processing unit that performs the three-dimensional processing on the plurality of images such that the parallax of the main object is the minimum, thereby generating the image for three-dimensional display,
   wherein the main object determining unit includes a priority adjusting unit that adjusts the priority;
   wherein a three-dimensional effect evaluation value for each face is determined on the basis of a three-dimensional effect evaluation function having a point that is one-third of the distance from a front of the image to a rear of the image in the depth direction as the vertex; and
   wherein a face having a maximum three-dimensional effect evaluation value is used as the face with the highest priority and is determined to be the main object.

6. The image processing apparatus according to claim 5, wherein the pixel disposed at the intermediate distance is at a point that is one-third of the distance from a front of the image to a rear of the image the depth direction when the pixels are arranged in order of distance.

7. The image processing apparatus according to claim 5, wherein, when two faces are detected in the image and are arranged in order of distance, the main object determining unit further has a function of determining the face arranged on the front side in the depth direction to be the main object.

8. The image processing apparatus according to claim 5, wherein the priority adjusting unit adjusts the priority on the basis of at least one of the characteristics of the display unit, the reliability of each face, the size of each face, the expression of each face, the color of a region below each face, and the percentage of the color of the skin in a predetermined range of the region below each face.

9. An image processing method that performs three-dimensional processing for three-dimensional display on a plurality of images which includes a plurality of faces and has different points of view and generates an image for three-dimensional display which is three-dimensionally displayed on a display unit for three-dimensional display, comprising:
- detecting a face in the image;
- calculating the distance of each face in a depth direction on the basis of the amount of parallax between the plurality of images;
- determining a face disposed at an intermediate distance, serving as a face with the highest priority, to be a main object when three or more faces are detected in the image and are arranged in order of distance;
- determining a three-dimensional effect evaluation value for each face on the basis of a three-dimensional effect evaluation function having a point that is one-third of the distance from a front of the image to a rear of the image in the depth direction as the vertex;
- using a face having a maximum three-dimensional effect evaluation value as the face with the highest priority and determining said face to be the main object;
- adjusting the priority; and
- performing the three-dimensional processing on the plurality of images such that the parallax of the main object is the minimum, thereby generating the image for three-dimensional display.

10. An image processing method that performs three-dimensional processing for three-dimensional display on a plurality of images which includes a plurality of faces and has different points of view and generates an image for three-dimensional display which is three-dimensionally displayed on a display unit for three-dimensional display, comprising:
- detecting a face in the image;
- calculating the distance of each pixel of the image in a depth direction on the basis of the amount of parallax between the plurality of images;
- determining a face closest to the pixel disposed at an intermediate distance, serving as a face with the highest priority, to be a main object when three or more faces are detected in the image and the pixels are arranged in order of distance;
- determining a three-dimensional effect evaluation value for each face on the basis of a three-dimensional effect evaluation function having a point that is one-third of the distance from a front of the image to a rear of the image in the depth direction as the vertex;
- using a face having a maximum three-dimensional effect evaluation value as the face with the highest priority and determining said face to be the main object;
- adjusting the priority; and
- performing the three-dimensional processing on the plurality of images such that the parallax of the main object is the minimum, thereby generating the image for three-dimensional display.

11. A non-transitory computer readable medium that allows a computer to perform an image processing method that performs three-dimensional processing for three-dimensional display on a plurality of images which includes a plurality of faces and has different points of view and generates an image for three-dimensional display which is three-dimensionally displayed on a display unit for three-dimensional display, comprising:
- detecting a face in the image;
- calculating the distance of each face in a depth direction on the basis of the amount of parallax between the plurality of images;
- determining a face disposed at an intermediate distance, serving as a face with the highest priority, to be a main object when three or more faces are detected in the image and are arranged in order of distance;
- determining a three-dimensional effect evaluation value for each face on the basis of a three-dimensional effect evaluation function having a point that is one-third of the distance from a front of the image to a rear of the image in the depth direction as the vertex;
- using a face having a maximum three-dimensional effect evaluation value as the face with the highest priority and determining said face to be the main object;
- adjusting the priority; and
- performing the three-dimensional processing on the plurality of images such that the parallax of the main object is the minimum, thereby generating the image for three-dimensional display.

12. A non-transitory computer readable medium that allows a computer to perform an image processing method that performs three-dimensional processing for three-dimensional display on a plurality of images which includes a plurality of faces and has different points of view and generates an image for three-dimensional display which is three-dimensionally displayed on a display unit for three-dimensional display, comprising:
- detecting a face in the image;
- calculating the distance of each pixel of the image in a depth direction on the basis of the amount of parallax between the plurality of images;
- determining a face closest to the pixel disposed at an intermediate distance, serving as a face with the highest priority, to be a main object when three or more faces are detected in the image and the pixels are arranged in order of distance;
- determining a three-dimensional effect evaluation value for each face on the basis of a three-dimensional effect evaluation function having a point that is one-third of the distance from a front of the image to a rear of the image in the depth direction as the vertex;
- using a face having a maximum three-dimensional effect evaluation value as the face with the highest priority and determining said face to be the main object;
- adjusting the priority; and
- performing the three-dimensional processing on the plurality of images such that the parallax of the main object is the minimum, thereby generating the image for three-dimensional display.

* * * * *